W. W. MORGAN.
THERMOSTATIC VALVE.
APPLICATION FILED APR. 29, 1916.
1,308,856.
Patented July 8, 1919.
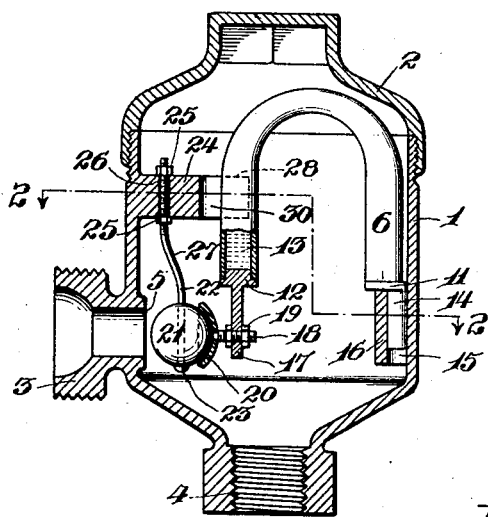
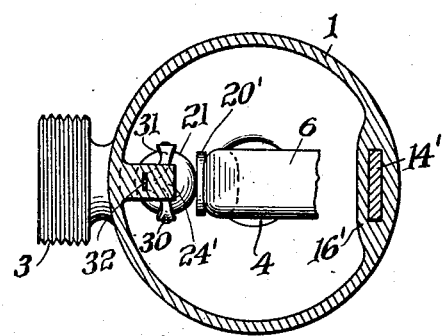
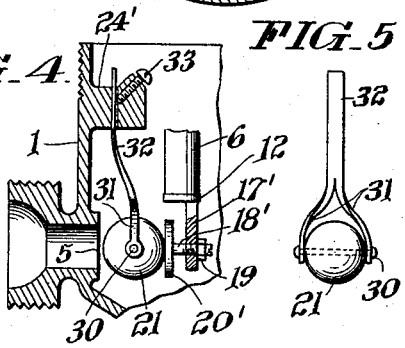
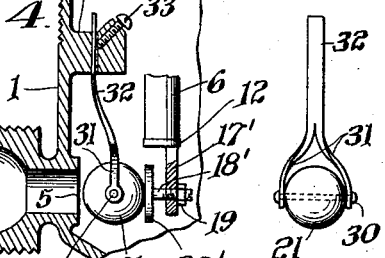
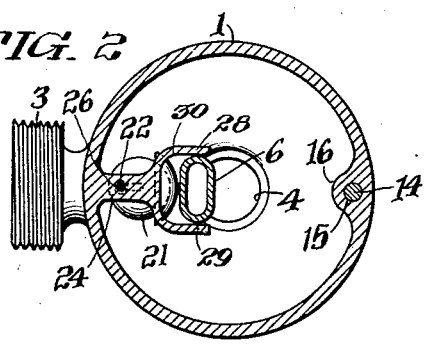
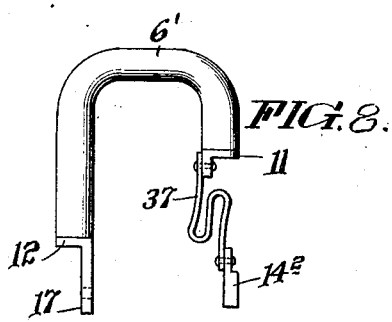
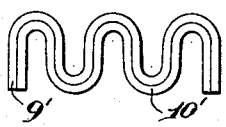
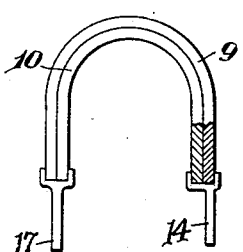
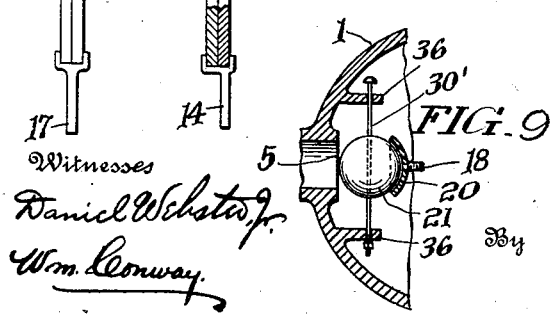
Witnesses
Daniel Webster Jr.
Wm. Conway.
Inventor
William Wint Morgan
By W. Steell Jackson
Attorney
THE COLUMBIA PLANOGRAPH CO., WASHINGTON, D. C.

UNITED STATES PATENT OFFICE.

WILLIAM WINT MORGAN, OF PHILADELPHIA, PENNSYLVANIA.

THERMOSTATIC VALVE.

1,308,856.  Specification of Letters Patent.  Patented July 8, 1919.

Application filed April 29, 1916. Serial No. 94,295.

*To all whom it may concern:*

Be it known that I, WILLIAM WINT MORGAN, a citizen of the United States, residing at 1634 S. Broad street, Philadelphia, in the county of Philadelphia and State of Pennsylvania, have invented a certain new and useful Thermostatic Valve, of which the following is a specification.

The purpose of my invention is to provide a thermostatic valve suitable for radiator use, in which the valve presents new faces from time to time to the seat.

A further purpose of my invention is to provide an oscillatory or rotatable valve for the engagement with the seat in a thermostatic valve.

A further purpose of my invention is to eliminate or reduce the friction of the valve member and valve guide.

Further purposes of my invention are to suspend a valve, pressing it to its seat by an independent thermostatic member, to facilitate adjustment of the suspended valve, to control the ultimate pressure of the valve against its seat by adjusting the medium of engagement between the thermostatic member and the valve and to relieve the pressure of the thermostatic member by inserting a separate spring portion, particularly useful in connection with a Bourdon tube.

Further purposes will appear in the specification and claims hereof.

In the drawings I have illustrated but a few of the forms in which my invention may be used, selecting a number which are practical, efficient, relatively inexpensive and which at the same time well illustrate the principles of my invention.

Figure 1 is a vertical central section through the preferred form of my invention.

Fig. 2 is a cross section upon the line 2—2 of the structure seen in Fig. 1.

Fig. 3 is a transverse section of a second form of my invention.

Fig. 4 is a fragmentary, vertical, central section of Fig. 3.

Fig. 5 is an elevation of the valve element and its suspension as used in Figs. 3 and 4.

Figs. 6, 7 and 8 are side elevations, Fig. 6 being partly broken, showing other forms of thermostatic element.

Fig. 9 is a horizontal section through the axis of the valve seat, showing a modified form of ball valve suspension.

In the drawings, similar numerals indicate like parts.

My valve is intended for general use, but will find its greatest utility at the present time in return control from any heating units.

The body 1 is closed at the top by a cap 2 and is provided with an external threaded connection 3 for attachment to the radiator and an internal threaded connection 4 for the return piping. The valve seat 5 is intended to be closed by a valve operated by a thermal or thermostatic element.

Describing my constructions, without intending to confine myself to these alone:—

In Fig. 1, I have shown a Bourdon tube 6 and in Figs. 6 and 7 I have shown bi-metallic members 9, 10, 9', 10'. Both the Bourdon tube and the bi-metallic members are broadly old and are not intended to be specifically covered by me except in so far as they form combinations with the remainder of the mechanism, including that with the spring in Fig. 8.

The terminals 11, 12 of the tube 6 are, as is usual, sealed into the tube so as to confine the liquid 13 securely therein. The terminal 11 need not perform directing functions, where the other end of the thermostatic valve is to be guided, and hence may even be circular in cross section, as at 14, fitting into a socket 15, within a lug 16, secured upon the inside of the body of the valve.

The terminal 12 is provided with a depending tongue 17, within which is secured a transversely directed threaded stem 18, adjustable by nuts 19. One end of the stem 18 carries a cup 20 by which ball valve 21 is pressed toward and ultimately against the valve seat 5 with expansion of the tube. The cup is preferably somewhat larger than the ball. The ball is rotatably supported upon a hanger 22 of wire or other suitable resilient material headed at 23 and normally holding the ball away from its seat.

At its upper end, suspension 22 is supported from a lug 24 secured to the interior of the body of the valve and is adjustable as to height within this lug by nuts 25. Where it is desirable to pass the suspension through the lug, as at 26, comparatively close to the body of the casing, I prefer to offset the suspension, as at 27, in which case pressure of the ball toward the valve will swing it slightly downwardly, requiring initial adjustment of the ball very slightly above the axis of the valve seat.

Because of the resilient engagement of the ball with the cup, there will be very little tendency of the tube 6 to swing about the terminal 11, even though the character of the cross section of this terminal or of its fit in the socket 15 permit this. As an additional precaution, I here provide against accidental lateral displacement of the thermostatic tube by jar, or otherwise, by the arms 28, 29 of a yoke 30 which may be supported upon the same lug 24 from which the ball valve is suspended. It will be evident that the tube will normally not engage with the inner sides of the yoke, because the ball will straighten it by engagement with the cup, but that all tendency to side movement of the relatively free end of the tube will be corrected by the yoke.

I find that the normal resilient engagement of the ball with the cup in the contracted position of the tube will not require further movement of the ball away from the valve seat than is desirable to allow free passage of fluid through the valve.

In operation, the thermostatic element begins to expand as soon as its temperature is raised by the fluid. This causes the cup which forms the presser face to force the ball valve against the valve seat and the ultimate extent of this pressure is adjustable by adjustment of stem 18 in tongue 17. The ball is free to turn upon a vertical axis and will be likely to turn from time to time because of the flow of fluid through the valve, even if the surface of the ball be entirely uniform.

The slightest lack of uniformity of wear or injury to the ball about its surface of engagement with the valve seat will roughen the surface of the ball sufficiently to cause the flow of fluid to turn the ball immediately, presenting successive new surfaces of the ball for engagement with the seat.

In Figs. 3, 4 and 5, the tube 6 is anchored against swinging within the body of the valve by having its terminal 11 provided with a strip of rectangular cross section 14' engaging in a corresponding rectangular seat within lug 16'. This performs the function of preventing excessive lateral movement of the thermostatic element which is performed by the yoke arms 28 and 29 in my preferred form. In this form, I screw the stem 18' into the tongue 17' and lock in adjusted position by nut 19. The stem 18' here carries a member 20' of disk form which presses against the ball 21 and forces the ball against the valve seat.

The suspension of the ball is here varied, in that it is given an axis at right angles to the axis of the ball of my preferred form, being supported upon a pin 30, horizontal in the view, within the yoke 31 of a depending spring strip 32 and this strip is held in adjusted position within a lug 24' by screw 33.

The operation in this form is closely similar to that in the first form. The ball is free to turn, but in a different direction. The reason for its turning will be substantially the same as in the other form.

In the form shown in Fig. 9, an effect of suspension similar to that of Figs. 3–5 is obtained by mounting the ball rotatably upon a horizontal rod 30' which is out of line with the axis of the valve seat and is intended to be much longer than the ball to allow the ball to be pressed against the valve seat without excessively bending the wire of the rod. At opposite ends it is supported in openings within lugs 36. The openings have plenty of room in a horizontal plane to allow for insertion of the rod at an angle and bending of the rod but hold the ball up substantially to the axis of the valve seat vertically. A cup, similar to that of Fig. 1, is preferably here used to keep the ball opposite the seat.

In order to indicate that my invention is not restricted to any one form of thermostatic operation, I have illustrated other forms and principles of thermal elements in Figs. 6, 7 and 8. In Fig. 6, a bi-metallic element is shown. It is provided with one terminal corresponding to that at the right in Fig. 3 and the other terminal corresponding to that at the left in Fig. 1.

In Fig. 7, I have shown the bi-metallic element as serpentine and without terminals.

In Fig. 8, I have shown a different shape of Bourdon tube. 6' in which the tube is relieved from excessive strain in a direction transverse to the U, after the valve has reached its closed position by a flat spring 37 reversely turned to give the benefit of additional length and secured to the terminal 11 at one end and strip $14^2$ at the other. This form reduces the expense of manufacture of the Bourdon tube as it need not be tempered with quite the same care and less care is required to determine the total expansion of the tube.

It will be evident that the positioning of the relatively free end of the thermal element by the cup and ball will normally relieve against even such slight friction of the sides of the thermal element against the inside of the yoke as might otherwise be present during the operation of the element.

Having thus described my invention, what I claim as new and desire to secure by Letters Patent is:—

1. In a thermostatic valve, a valve body provided with an inlet about which is formed a valve seat, a ball, a depending resilient support for the ball, normally holding it away from the seat and upon which the ball is capable of turning, a thermal member and a terminal for the thermal member adapted to engage the ball and force it against the seat.

2. In a thermostatic valve, a valve body provided with an inlet about which is formed a valve seat, a ball in front of the seat, a depending resilient support for the ball about which it is capable of turning, means for adjusting the height of the support and thermally-actuated means for pressing the ball against the seat.

3. In a thermostatic valve, a valve body provided with an inlet about which is formed a valve seat, a ball in front of the seat, a resilient support for the ball normally holding it away from the seat, a thermal element secured with respect to the body at one end so as to be capable of movement about that end and a cupped terminal for the other end of the thermal element engaging the ball and positioned laterally by said engagement.

4. In a thermostatic valve, a valve body provided with an inlet about which is formed a valve seat, a ball in front of the seat, a depending resilient support for the ball normally holding it away from the seat, a thermostatic element secured with respect to the body at one end so as to be free to swing about that end, a cupped terminal for the other end of the thermal element engaging the ball and positioned laterally by said engagement and a yoke limiting against excessive lateral movement of the relatively free end of the thermal element.

WILLIAM WINT MORGAN.

Witnesses:
J. LUTHERIA KAUFFMAN,
WM. STEELL JACKSON.

Copies of this patent may be obtained for five cents each, by addressing the "Commissioner of Patents, Washington, D. C."